United States Patent
Jones et al.

(10) Patent No.: US 12,282,438 B2
(45) Date of Patent: Apr. 22, 2025

(54) SCALABLE STORAGE USING NVMe COMMUNICATION

(71) Applicant: Seagate Technology LLC, Fremont, CA (US)

(72) Inventors: Marc Timothy Jones, Longmont, CO (US); Jason Wayne Kinsey, Longmont, CO (US); Benjamin James Scott, Longmont, CO (US); Robert William Dixon, Longmont, CO (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 17/587,285

(22) Filed: Jan. 28, 2022

(65) Prior Publication Data

US 2023/0244613 A1 Aug. 3, 2023

(51) Int. Cl.
*G06F 13/28* (2006.01)
*G06F 12/02* (2006.01)
*G06F 13/16* (2006.01)
*G06F 13/40* (2006.01)
*G06F 13/42* (2006.01)

(52) U.S. Cl.
CPC ...... *G06F 13/1668* (2013.01); *G06F 12/0253* (2013.01); *G06F 13/28* (2013.01); *G06F 13/4022* (2013.01); *G06F 13/4221* (2013.01)

(58) Field of Classification Search
CPC .................................................. G06F 13/1668
USPC ........................................................ 711/154
See application file for complete search history.

(56) References Cited

U.S. PATENT DOCUMENTS

| | | | | |
|---|---|---|---|---|
| 2010/0077117 | A1* | 3/2010 | Asnaashari | G06F 13/385 710/74 |
| 2013/0024595 | A1* | 1/2013 | Subramaniyan | G06F 13/28 710/316 |
| 2014/0281040 | A1* | 9/2014 | Liu | G06F 9/50 710/3 |
| 2014/0281106 | A1* | 9/2014 | Saghi | G06F 3/0664 710/313 |
| 2014/0325013 | A1* | 10/2014 | Tamir | G06F 21/79 709/212 |
| 2014/0337540 | A1* | 11/2014 | Johnson | G06F 13/14 710/5 |
| 2015/0261434 | A1* | 9/2015 | Kagan | G06F 13/28 711/103 |
| 2015/0317088 | A1* | 11/2015 | Hussain | G06F 3/0688 711/103 |
| 2015/0324118 | A1* | 11/2015 | McCambridge | G06F 13/4282 710/5 |
| 2018/0253386 | A1* | 9/2018 | Qiu | G06F 13/1668 |
| 2018/0307521 | A1* | 10/2018 | Pinto | G06F 12/0238 |
| 2019/0243788 | A1 | 8/2019 | Stonelake et al. | |

(Continued)

*Primary Examiner* — Titus Wong
(74) *Attorney, Agent, or Firm* — HOLZER PATEL DRENNAN (57) ABSTRACT

The technology disclosed herein pertains to a system and method for scaling storage using peer-to-peer NVMe communication, the method including selecting one of a plurality of NVMe devices as principal device to control communication with a host via a PCI switch, designating remainder of the plurality of NVMe devices as subordinate devices, and controlling the communication between the host and the subordinate devices using a PCI P2P DMA between the principal device and the subordinate devices.

18 Claims, 5 Drawing Sheets

(56) References Cited

U.S. PATENT DOCUMENTS

| | | |
|---|---|---|
| 2020/0042246 A1* | 2/2020 | Maharana ............. G06F 3/0604 |
| 2020/0210069 A1 | 7/2020 | Singh et al. |
| 2020/0218678 A1 | 7/2020 | Prabhakar et al. |
| 2021/0072893 A1 | 3/2021 | Singh et al. |
| 2021/0286752 A1 | 9/2021 | Modukuri et al. |
| 2021/0311665 A1* | 10/2021 | Maharana ............. G06F 3/0688 |

* cited by examiner

SCALABLE STORAGE USING NVMe COMMUNICATION

BACKGROUND

Electronic systems and devices have made a significant contribution towards the advancement of modern society and have facilitated increased productivity and reduced costs in analyzing and communicating information in a variety of business, science, education, and entertainment applications. Electronic systems use a variety of storage media to store data. Non-volatile media express (NVMe) is a media-agnostic storage protocol that operates over peripheral component interconnect (PCI) serial expansion bus. Multiple NVMe devices require separate channels of communication between the host and the drive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a system and method for scaling storage using peer-to-peer NVMe communication, the method including selecting one of a plurality of NVMe devices as principal device to control communication with a host via a PCIe switch, designating remainder of the plurality of NVMe devices as subordinate devices, and controlling the communication between the host and the subordinate devices using a PCI P2P DMA between the principal device and the subordinate devices.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Non-volatile media express (NVMe) is a media-agnostic storage protocol that operates over peripheral component interconnect (PCI) serial expansion bus. Multiple NVMe devices require separate channels of communication between the host and the drive, but this can be simplified without loss of performance by creating a principal NVMe device that exposes other NVMe devices in its domain as endurance groups. All media (made up of a collection of NVMe devices) are then accessible and managed through a single device simplifying the overhead of the host in managing a cluster of devices.

The technology disclosed herein pertains to a system and method for scaling storage using peer-to-peer NVMe communication, the method including selecting one of a plurality of NVMe devices as principal device to control communication with a host via a PCIe switch, designating remainder of the plurality of NVMe devices as subordinate devices, and controlling the communication between the host and the subordinate devices using a PCI P2P DMA between the principal device and the subordinate devices. Implementations disclosed herein provide a domain of devices that are managed under a single principal NVMe device that exposes the other devices as endurance groups. Such implementation reduces the overhead of the host in managing a collection of devices and allows it instead to manage a collection of endurance groups. In one implementation, a collection of P2P devices communicates with a PCI bus pathway.

Figure 1:
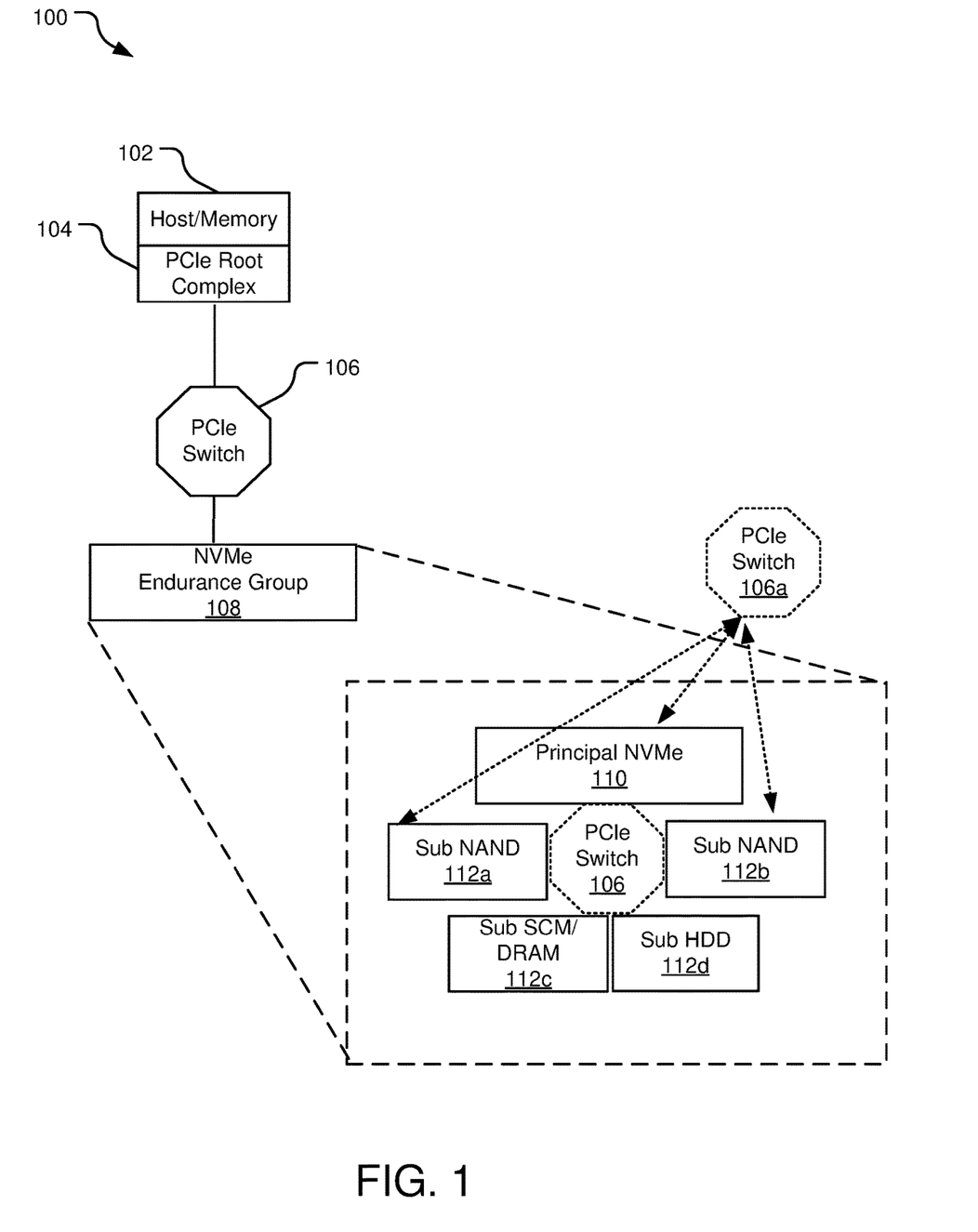
FIG. 1 illustrates a schematic diagram of an example system providing scalable storage using NVMe communication between storage devices and a host.

FIG. 1 illustrates a schematic diagram of a storage system 100 providing scalable storage using NVMe communication between storage devices and a host. Specifically, the storage system 100 includes a host device 102 connected via a peripheral component interconnect express (PCIe) root complex 104 and a PCIe switch 106 with a number of storage devices. In one implementation, the storage devices are configured as an NVMe endurance group 108. The NVMe endurance group 108 may include more than one storage device. In some implementations, all storage devices of the NVMe endurance group 108 may be similar, such as NAND storage devices. In alternative implementations, the NVMe endurance group 108 may include different kinds of storage devices, such as NAND storage devices, HDD, SSD, optical disc devices, etc.

In the illustrated implementation, an NVMe device 110 may be configured as a principal device, referred to here as principal NVMe 110. In such an implementation, only the principal NVMe 110 may communicate with the host 102 via the PCIe switch 106. Thus, in such an implementation, other sub storage devices 112 are not exposed to the host 102. For example, such other sub storage devices 112 may include a sub NAND 112a, a sub NAND 112b, a sub DRAM 112c, a sub HDD 112d, etc. Various storage devices of the NVMe endurance group 108 may have different endurance characteristics. For example, the sub NAND 112a may have different number of write/erase cycles left in its life compared to the sub NAND 112b.

The principal NVMe 110 may communicate with the sub storage devices 112 using the same PCIe switch 106 as is used to communicate with the host 102. Alternatively, another PCIe switch 106*a* that is in communication with the principal NVMe 110 and one or more of the sub storage devices 112 may be used for communication between various devices of the NVMe endurance group 108. The principal NVMe 110 may rely on peer-to-peer (P2P) direct memory access (DMA) capability of the PCIe switch 106 to manage communication between itself and the sub storage devices 112. Such P2P DMA communication between the principal NVMe 110 and the sub storage devices 112 means sending data directly between the principal NVMe 110 and the sub storage devices 112 without going through the host 102. As a result, there is no CPU overhead or need for synchronization at the host 102.

In the illustrated implementation, the principal NVMe 110 is configured to manage the administration and input/output (I/O) with the sub storage devices 112. As a result, the host 102 does not need to keep administration queues or I/O queues for its communication with the sub storage devices 112. At the same time, each of the sub storage devices 112 is still accessible to the host 102 for storage. However, the sub storage devices 112 are not exposed directly to the host 102. As a result, the entire NVMe endurance group 108 is exposed as a single device, simplifying the overhead of the host in managing a cluster of devices.

In one implementation, instead of exposing the sub storage devices 112 to the host 102, the principal NVMe 110 constructs a "domain" of devices that are managed under a single uber NVMe device that exposes the other devices as an endurance group (collections of media). As a result, the host 102 is able to manage a collection of media groups or endurance groups, similar to the NVMe endurance group 108. On the other hand, the principal NVMe 110 manages the administration and I/O with the sub storage devices 112 based on their endurance characteristics. Thus, subsystem of the principal NVMe 110 is used as an interface to the host 102 and the sub storage devices 112 are treated as endurance group or namespace of the principal NVMe 110.

For example, in one implementation, the principal NVMe 110 manages the administration and I/O with the sub storage devices 112 in view of the data heat and the endurance characteristics. Thus, if the sub NAND 112*b* is determined to have high latency, hot data may be diverted away from the sub NAND 112*b*. In an alternative implementation, the principal NVMe 110 also manages the garbage collection among the sub storage devices 112 using the P2P DMA communication using the PCIe switch 106.

In one implementation, the principal NVMe 110 also maintains I/O command completion queue for each of the sub storage devices 112 and communicates the I/O command completion queue information to the host 102 and to the sub storage devices 112. Thus, for example, the principal NVMe 110 manages I/O submission queues and transfers I/O commands to the sub storage devices 112, whereas the sub storage devices 112 performs completion of the I/O commands.

In one implementation, once the sub storage devices 112 are designated as part of the endurance group of namespace of the principal NVMe 110, the class code of the sub storage devices 112 at the host is changed such that an NVMe driver of the host 102 does not attach to the remainder of the plurality of NVMe devices. Such changed class codes may be subsequently stored in a memory of the host 102. In one implementation, the changed class codes may be stored in a random-access-memory (RAM) of the host such that it cannot be changed by the host.

Figure 2:
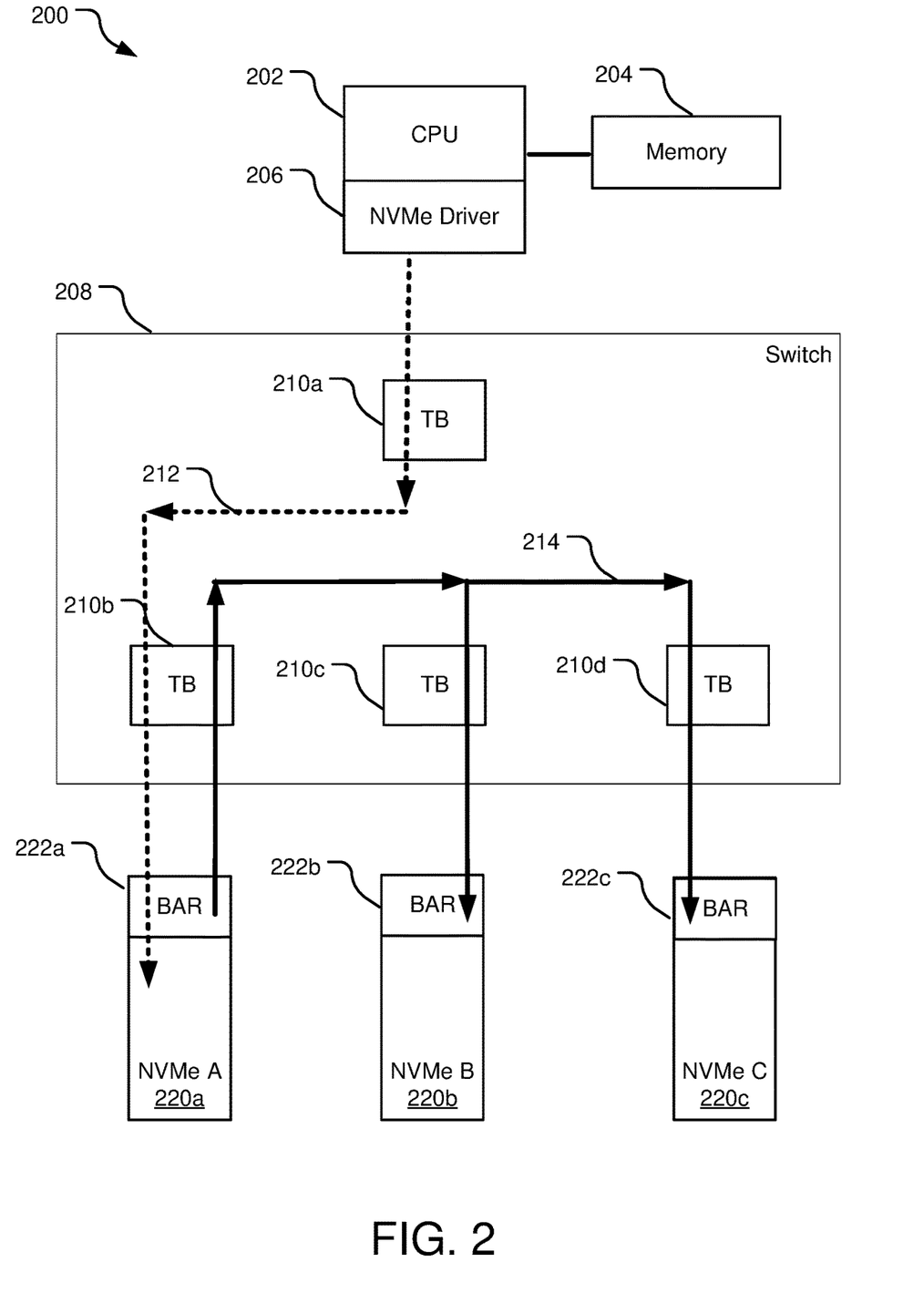
FIG. 2 illustrates an alternative schematic diagram of an example system for providing scalable storage using NVMe communication between storage devices and a host.

FIG. 2 illustrates an alternative schematic diagram of a storage system 200 for providing scalable storage using NVMe communication between storage devices and a host. In the illustrated implementation a host with a CPU 202 and memory 204 is in communication with a number of storage devices 220 via a PCIe switch 208. The PCIe switch may be configured to allow P2P DMA communication between various storage devices 220. For example, the storage devices 220 may include NVMe storage devices 220*a*, 220*b*, and 220*c*. Alternatively, one or more of the storage devices 220 may also be a different type of storage device, such an HDD, and SSD, etc.

The PCIe switch 208 includes a number of transparent bridges 210 that act as upstream and downstream ports of the PCIe switch and are used by the various devices to communicate with each other using P2P DMA. For example, the transparent bridge 210*a* may allow the NVMe A 220*a* to communicate with the host 202, the transparent bridges 210*b* and 201*c* may allow the NVMe A 220*a* to communicate with NVMe B 220*b*, etc. In the illustrated implementation, the NVMe A 220*a* may be designated as the principal NVMe and the other storage devices may be designated as the sub storage devices of the endurance group or namespace of the principal NVMe. For example, the class code of the NVMe B 220*b* and the NVMe C 220*c* may be changed in the memory 204 such that an NVMe r 206 of the host does not attach to the NVMe B 220*b* and the NVMe C 220*c*.

As shown by path 212, the CPU 202 of the host communicates commands for all of the storage devices to the principal NVMe, NVMe A 220*a*. Subsequently, NVMe A 220*a* manages the I/O queues and the administration of the sub NVMe B 220*b* and the sub NVMe C 220*c*. For example, the principal NVMe may include a base address register (BAR) 222*a* that may be used to request memory and I/O apertures from the sub NVMe B 220*b* and the sub NVMe C 220*c*. The BAR 222*a* may be used by the host 202 to map memory to one of the principal NVMe or the sub NVMes. The principal NVMe 220*a* may communicate to other NVMes by issuing a read or write via PCIe bus to the BARs 222*b* and 222*c* of such other NVMes.

In the illustrated implementation, the principal NVMe, NVMe A 220*a* receives I/O commands from the host 102, decodes the I/O command and transfers the execution to one of the sub NVMe B 220*b* and the sub NVMe C 220*c* as necessary. Here the principal NVMe, NVMe A 220*a* may also manage the administration of the sub NVMes such as garbage collection, etc.

Figure 3:
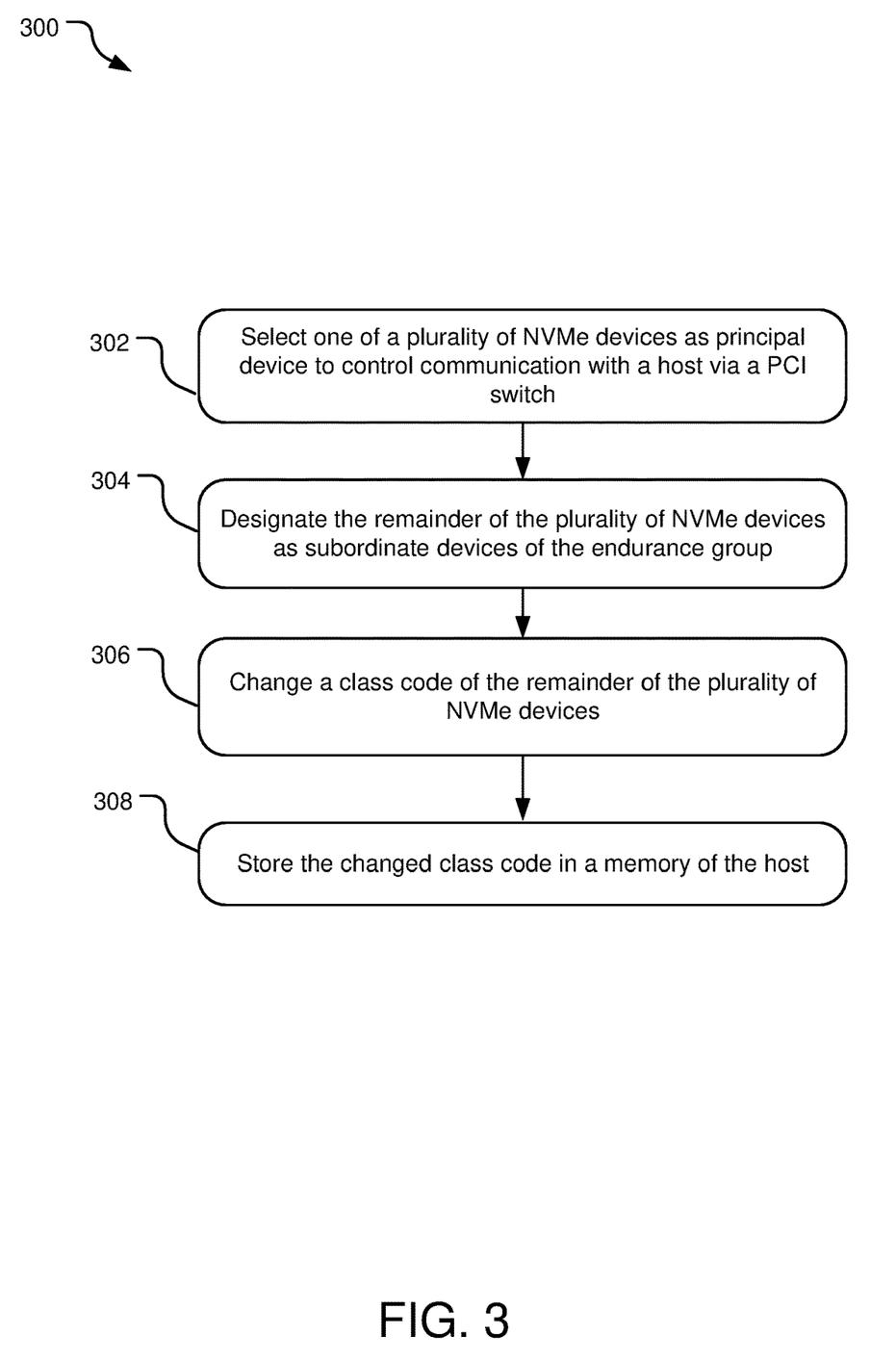
FIG. 3 illustrates example operations for providing scalable storage using NVMe communication between storage devices.

FIG. 3 illustrates operations 300 for providing scalable storage using NVMe communication between storage devices. Specifically, the operations 300 disclose a method of configuring a group of storge devices as an endurance group where one of the devices is configured as a principal device that communicates with a host and with the other devices using P2P DMA capability of a PCIe switch. An operation 302 selects one of a plurality of NVMe devices as principal device to control communication with a host via a PCIe switch. An operation 304 designates the remainder of the plurality of NVMe devices as subordinate devices of the endurance group. Subsequently, an operation 306 changes a class code of the remainder of the plurality of NVMe devices such that an NVMe driver of the host does not attach to the remainder of the plurality of NVMe devices. An operation 308 stores the changed class code in a memory of the host. In one implementation, such memory of the host may be random-access-memory (RAM) that may not be changeable by the host.

Figure 4:
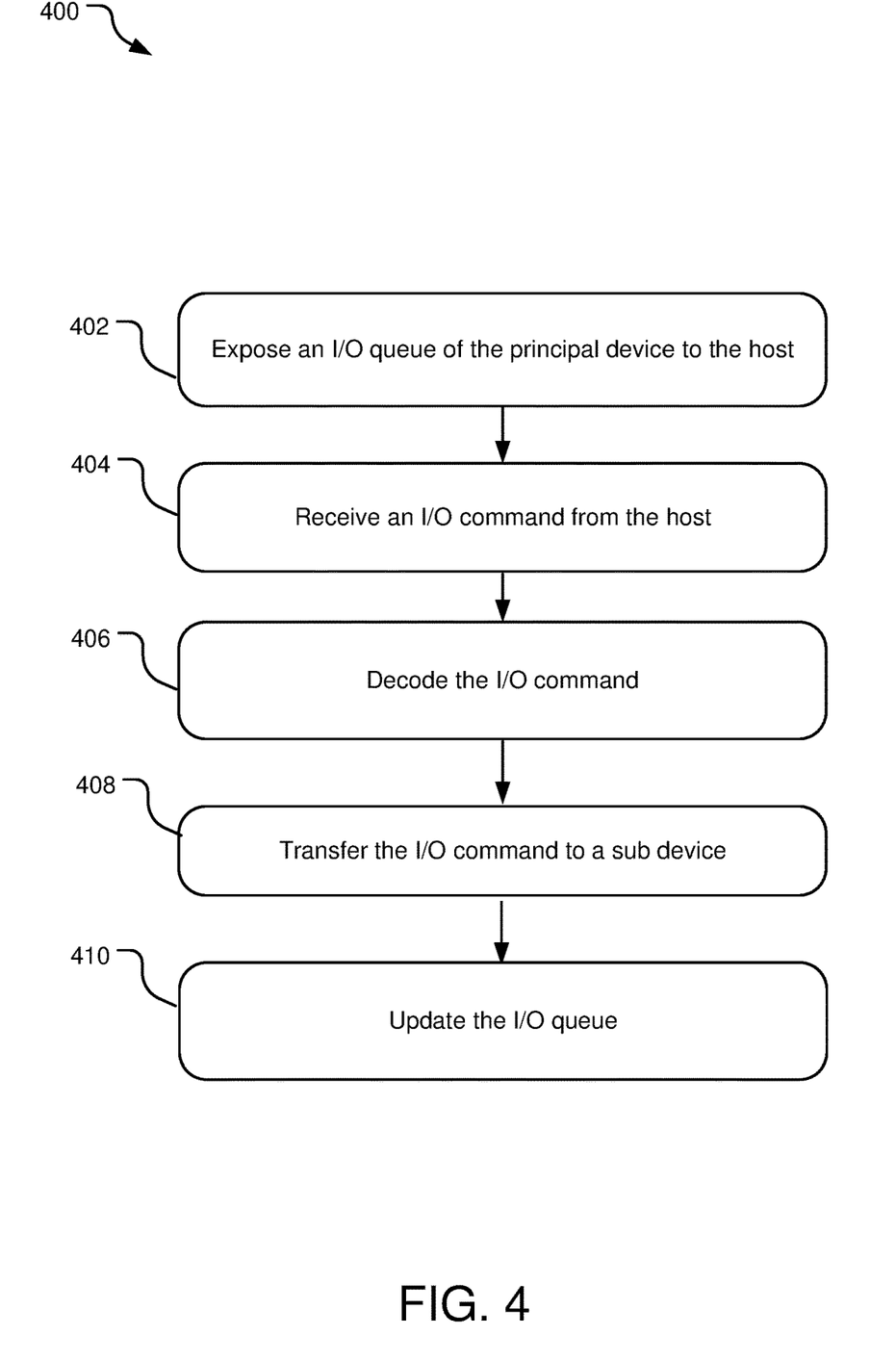
FIG. 4 illustrates alternative example operations for providing scalable storage using NVMe communication between storage devices.

FIG. 4 illustrates alternative operations 400 for providing scalable storage using NVMe communication between storage devices. Specifically, the operations 400 disclose using an endurance group or a namespace where one device is configured as a principal device and the other devices are configured as subordinate devices that communicate with the principal device using P2P DMA capabilities of an NVMe switch.

An operation 402 exposes an I/O queue of the principal device, such as an I/O queue of a principal NVMe, to the host. An operation 404 receives an I/O command from the host. Specifically, the I/O command is received at the principal device via an NVMe switch. At operation 406, the principal device decodes the I/O command to determine which device should handle the I/O command. For example, operation 406 may determine that the I/O command should go to an HDD device that is designated as a sub device of the principal device endurance group. Subsequently, an operation 408 transfers the I/O command to such sub device using P2P DMA capability of the PCIe switch.

In one implementation, an operation 410 may update the I/O queue after communicating the I/O command to the appropriate sub device. Subsequently, such updated I/O queue is exposed to the host. As result of the implementation as provided in FIG. 4, the host has to manage only one I/O queue with the principal device, thus reducing the overhead at the host level. Furthermore, the operations 400 also allows for the principal device to act as administrator of the sub devices based on their endurance levels.

Figure 5:
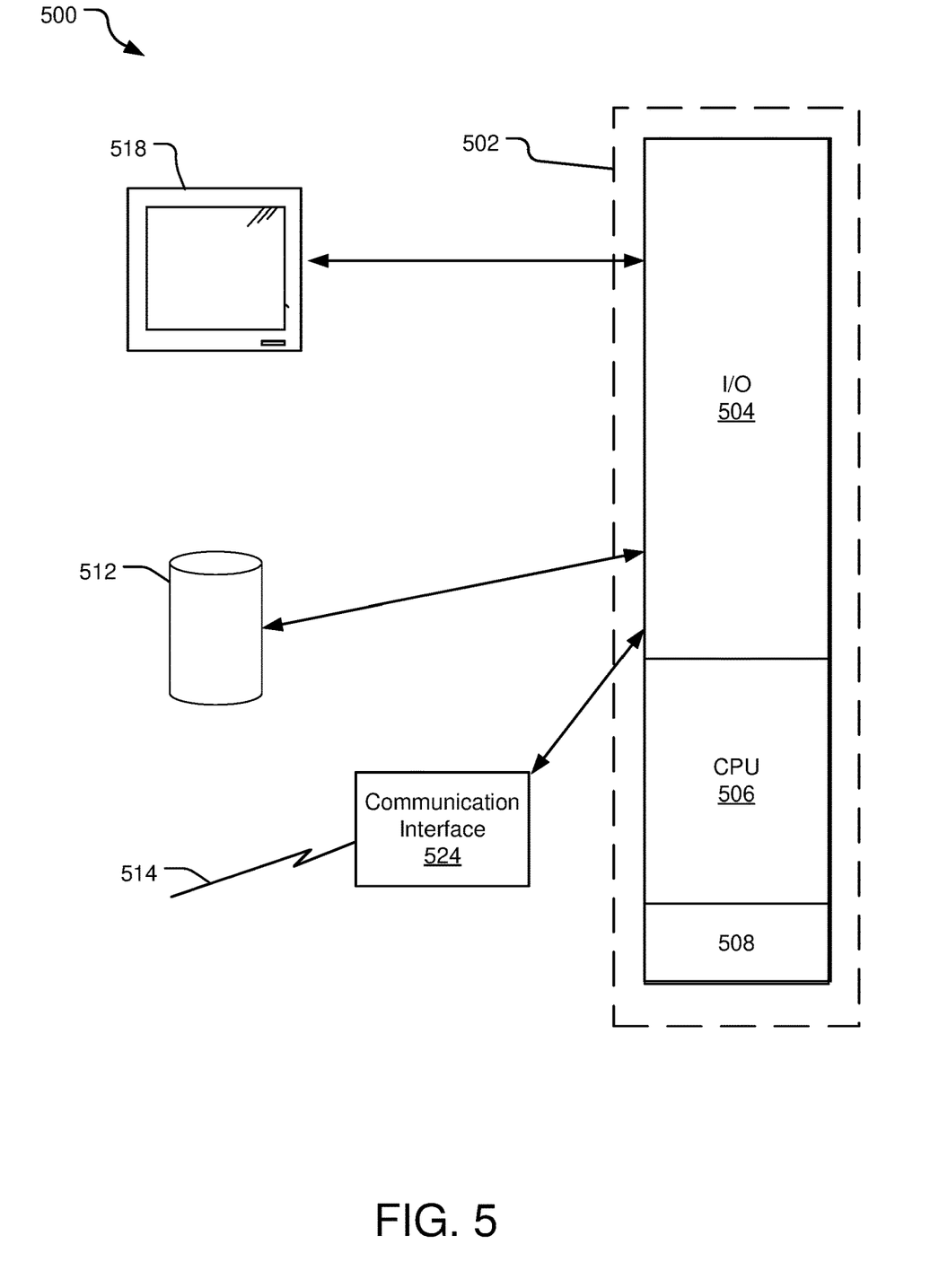
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
    selecting one of a plurality of NVMe devices as principal device to control communication with a host via a PCIe switch;
    designating remainder of the plurality of NVMe devices as subordinate devices;
    exposing an I/O queue of the principal device to the host such that the host communicates with the subordinate devices without the subordinate devices being exposed to the host;
    controlling the communication between the host and the subordinate devices using a PCI peer-to-peer direct memory access (PCI P2P DMA) between the principal device and the subordinate devices;
    changing class codes of the remainder of the plurality of NVMe devices such that an NVMe driver of the host does not attach to the remainder of the plurality of NVMe devices; and
    storing the changed class codes in a memory of the host such that the changed class codes cannot be changed by the host.

2. The method of claim 1, wherein one or more process commands received from the host for any of the plurality of NVMe devices are processed at the principal device.

3. The method of claim 1, wherein the principal device is further configured to transfer one or more input/output commands received from the host to one or more of the subordinate devices using the PCI P2P DMA between the principal device and the subordinate devices.

4. The method of claim 1, wherein the principal device is further configured to undertake data transfers between the one or more of the plurality of subordinate devices using the PCI P2P DMA between the principal device and the subordinate devices based on data heat of the plurality of subordinate devices.

5. The method of claim 1, wherein the principal device is further configured to undertake garbage collection for the one or more of the plurality of subordinate devices using the PCI P2P DMA between the principal device and the subordinate devices.

6. The method of claim 1, wherein the principal device is further configured to facilitate hot remove of any of the one or more subordinate devices.

7. The method of claim 1, wherein the principal device is further configured to notify the host of a change in type of media of the one or more subordinate devices.

8. In a computing environment, a method performed at least in part on at least one processor, the method comprising:
    selecting one of a plurality of NVMe devices as principal device to control communication with a host via a PCIe switch;
    designating remainder of the plurality of NVMe devices as subordinate devices;
    exposing an I/O queue of the principal device to the host such that the host communicates with the subordinate devices without the subordinate devices being exposed to the host;
    controlling the communication between the host and the subordinate devices using a PCI peer-to-peer direct memory access (PCI P2P DMA) between the principal device and the subordinate devices;
    changing class codes of the remainder of the plurality of NVMe devices such that an NVMe driver of the host does not attach to the remainder of the plurality of NVMe devices; and
    storing the changed class codes in a memory of the host such that the changed class codes cannot be changed by the host.

9. The method of claim 8, one or more process commands received from the host for any of the plurality of NVMe devices are processed at the principal device.

10. The method of claim 8, wherein the principal device is further configured to transfer one or more input/output commands received from the host to one or more of the subordinate devices using the PCI P2P DMA between the principal device and the subordinate devices.

11. The method of claim 8, wherein the principal device is further configured to undertake data heat based data transfers between the one or more of the plurality of subordinate devices using the PCI P2P DMA between the principal device and the subordinate devices based on data heat of the plurality of subordinate devices.

12. The method of claim 8, wherein the principal device is further configured to undertake garbage collection for the one or more of the plurality of subordinate devices using the PCI P2P DMA between the principal device and the subordinate devices.

13. The method of claim 8, wherein the principal device is further configured to facilitate hot remove of any of the one or more subordinate devices.

14. The method of claim 8, wherein the principal device is further configured to notify the host of a change in the type of media of the one or more subordinate devices.

15. One or more non-transitory computer-readable storage media encoding computer-executable instructions for executing on a computer system a computer process, the computer process comprising:
- selecting one of a plurality of NVMe devices as principal device to control communication with a host via a PCIe switch;
- designating remainder of the plurality of NVMe devices as subordinate devices;
- exposing an I/O queue of the principal device to the host such that the host is able to communicates with the subordinate devices without the subordinate devices being exposed to the host;
- controlling the communication between the host and the subordinate devices using a PCI peer-to-peer direct memory access (PCI P2P DMA) between the principal device and the subordinate devices;
- changing class codes of the remainder of the plurality of NVMe devices such that an NVMe driver of the host does not attach to the remainder of the plurality of NVMe devices; and
- storing the changed class codes in a memory of the host such that the changed class codes cannot be changed by the host.

16. One or more non-transitory computer-readable storage media of claim 15, wherein one or more process commands received from the host for any of the plurality of NVMe devices are processed at the principal device.

17. One or more non-transitory computer-readable storage media of claim 15, wherein the principal device is further configured to transfer one or more input/output commands received from the host to one or more of the subordinate devices using the PCI P2P DMA between the principal device and the subordinate devices.

18. One or more non-transitory computer-readable storage media of claim 15, wherein the principal device is further configured to undertake garbage collection for the one or more of the plurality of subordinate devices using the PCI P2P DMA between the principal device and the subordinate devices.

* * * * *